Feb. 3, 1959 W. M. HURST 2,872,274
ELECTRO-MECHANICAL CHRONOGRAPH
Filed April 19, 1957

INVENTOR.
WILLIAM M. HURST
BY
ATTYS.

United States Patent Office
2,872,274
Patented Feb. 3, 1959

2,872,274

ELECTRO-MECHANICAL CHRONOGRAPH

William M. Hurst, Fort Worth, Tex., assignor, by mesne assignments, to the United States of America as represented by the Secretary of the Navy Application April 19, 1957, Serial No. 654,048

4 Claims. (Cl. 346—38)

This invention relates to a chronograph and more particularly to a high speed chronograph of the strip chart recorder type having new and improved means for recording on a chart wrapped about a drum intervals of time corresponding to the occurrence of several phenomena in rapid succession while the drum carrying the chart is continuously revolving at a high speed.

The device is well suited to the recordation of elapsed time of a high velocity object such as, for example, as a projectile, as the projectile crosses several marker or fix stations in successive order during the trajectory thereof.

It has been the previous practice heretofore to employ instruments such as cathode ray oscilloscopes and electronic chronographs for the measurement of time intervals in the order of one to thirty milliseconds each for ascertaining the velocity of a projectile in flight whereby a signal is received from sensing devices at a plurality of stations disposed along the line of flight of the projectile as the projectile passes each of the stations. By this arrangement, the distance between the stations being known and the time of passage of the projectile past the stations being recorded, the average velocity of the projectile between any two stations may be computed.

Instruments such as cathode ray oscilloscopes and electronic chronographs have not been found to be altogether satisfactory for the purpose under all conditions of service for the reason that the wiring associated therewith is sensitive to shock waves from such high explosives. Furthermore, by reason of their high impedance inputs, they may respond to spurious transient pulse voltages generated in the length of field wiring required for instrument operation at a safe distance and, although housing the apparatus and operator in a concrete block house at a distance from the gun from which the projectile is fired has been necessary in some instances, this arrangement has not proved altogether satisfactory.

The chronograph of the instant invention possesses all of the advantages of the prior art devices and none of the foregoing disadvantages. This result is achieved, in accordance with the teaching of the present invention, by providing a plurality of spring elements held in a normally cocked position by a plurality of electromagnets individual thereto and continuously energized. The interruption of the operating circuit of each electromagnet causes the instant release of the cocked spring element which immediately flies to a release position and concurrently therewith places a sharp line on the chart carried by the drum while the drum is revolving at a high speed. The details of structure for achieving this result will be more clearly apparent as the description proceeds.

One of the objects of the present invention is the provision of new and improved means for recording intervals of time in quick succession upon a chart carried by a drum while the drum is rotating at a high speed.

Another of the objects is the provision of a normally cocked spring recording element and electroresponsive means for releasing the element to make a mark on a rapidly moving chart during movement of the element to a release position corresponding to the time of release of the element.

Still another object is to provide a new and improved electromechanical chronograph which is rugged in construction, reliable in operation and which possesses the desirable quality of insensitiveness to an explosive shock and low impedance input at the control circuits thereof.

Still other objects, advantages and improvements will be apparent from the following description taken in connection with the accompanying drawing of which:

Figure 1:
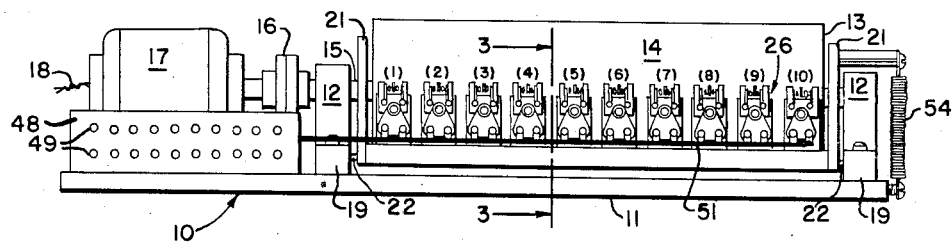
Fig. 1 is a view in elevation of the recorder of the instant invention according to a preferred embodiment thereof.

Referring now to the drawing on which like numerals of reference are employed to designate like parts throughout the several views and more particularly to Fig. 1 thereof, there is shown thereon an electro-mechanical chronograph of the drum recorder type indicated generally by the numeral 10 comprising a base 11 having a pair of supports 12 secured thereto. Journalled for rotation within the supports 12 is a drum 13 to which is secured in any suitable manner a chart 14 rotatable therewith. The drum is carried by shaft 15 having secured thereto a coupling member 16 for connection to a motor 17 secured in any suitable manner to the base 11 whereby the drum and chart are rotated by the motor at a high speed such, for example, as 1800 R. P. M. when power is supplied to the motor leads 18.

A pair of supports 19 secured to the base 11 are employed to carry a U-shaped bracket 21 pivoted thereto as at 22 and provided with a pair of extending arms 23—24 to limit movement of the bracket about pivots 22 as the arms 23 and 24 are selectively brought into engagement with base 11.

Figure 3:
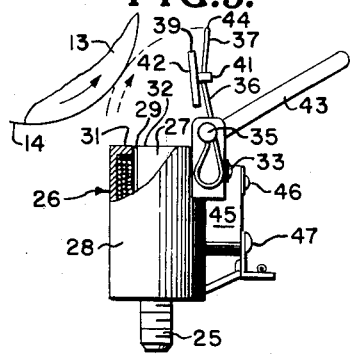
Fig. 3 is a view somewhat enlarged taken along the line 3—3 of Fig. 1.
Figure 4:
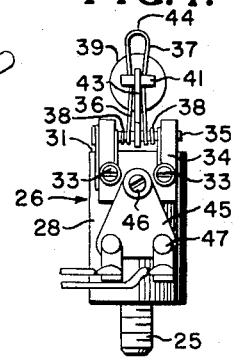
Fig. 4 is another view of the recording element of Fig. 3.

Bracket 21 is provided with a plurality of mounting holes arranged at intervals along the length thereof for receiving mounting studs 25 secured to the casings of electromagnetic recording elements each indicated generally by the numeral 26, the recording elements being securely clamped to the bracket by a nut (not shown) threaded on the stud 25. The electromagnetic recording element comprises an electromagnet having a core 27, Fig. 3, centrally arranged within a magnetic shell 28 in a manner to form an annular air gap 29 therebetween. The upper surface 31 of shell 28 is machined or otherwise formed in a plane with the upper end surface 32 of core 27. Secured to the shell 28 as by the screws 33 is a bracket 34 carrying a rod or bearing pin 35 about which is disposed a spring marker element 36 having a bifurcated portion 37 formed thereon and a pair of helical portions 38 encircling pin 35, the ends of the spring element being secured to bracket 34 as by the screws 33 illustrated. The bifurcated portion 37 is secured to a thin circular armature 39 composed of suitable magnetic material as by the clamp or clip 41 in such manner that the armature may be moved to an adjusted position along the bifurcated portion 37 of the spring such that the flat face 42 thereof may be moved into close fitting engagement with surfaces 31 and 32 by lever 43 pivotally carried by bearing pin 35 intermediate the two helical portions 38 of the spring. The outer end of spring marker element 38 is covered with a china marking crayon pencil at 44 thereby to mark the drum chart during high speed rotation of the drum as the spring marker element is released upon de-energization of the electromagnet within the recording element.

A mounting plate 45 composed of insulating material suitable for the purpose such, for example, as Bakelite, is secured to the bracket 34 as by the screw 46. The mounting plate carries two terminals 47 for establishing an external electrical connection to the ends of the electromagnet winding connected thereto. There is also provided a terminal board 48 secured to the base 11 in any suitable manner and provided with a plurality of terminals 49 for connection to terminals 47 of the electromagnetic recorders by means of cable 51 connected therebetween.

Figure 5:
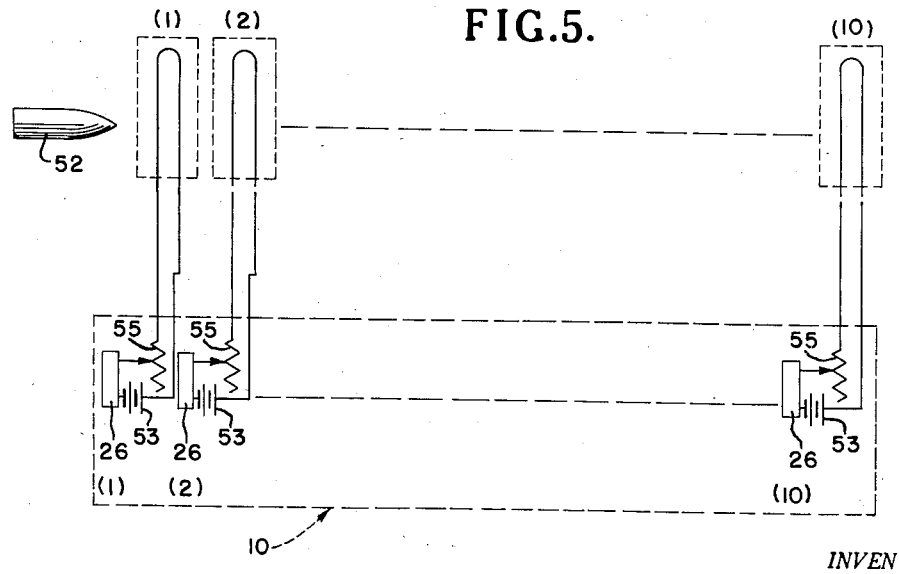
Fig. 5 is a circuit diagram of the device suitable for use in measuring the velocity of a projectile in flight.

Referring now to Fig. 5 on which is shown the device of the present invention connected to record the time of travel of a projectile 52 in flight as the projectile passes the plurality of fixes or marker stations (1)–(10) in successive order. Each of the recording elements 26 is connected by a pair of conductors to a marker or fix station respectively associated therewith in a manner to form a closed circuit including a battery 53. The recording element is continuously energized over this circuit until the circuit is interrupted by the projectile 52 as the projectile passes the associated marker station. Marker station (1), for example, may be conveniently located near the gun from which the projectile is fired and stations (2)–(10) located at progressively increasing distances therefrom.

Figure 2:
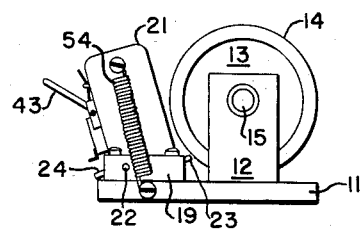
Fig. 2 is an end view of the device of Fig. 1.

The operation of the device will now be described. Let it be assumed, by way of example, that the recorder is connected to ten marker stations within the path of projectile 52 as shown on Fig. 5. Let it further be assumed that bracket 21 has been moved to the position shown on Fig. 2 and that the levers 43 of the recording elements have been momentarily rotated to a cocked position such that armatures 39 engage the surfaces 31 and 32 of the core and shell of the electromagnets respectively and are held in this position by electromagnetic attraction. The lever 43 is now restored to the position shown on Fig. 3 and the bracket 21 is moved to the operating position with extending arm 23 thereof engaging base 11, in which position it is held by spring 54. The motor 17 is now set into operation.

With the bracket 21 moved to the operated position, the marking end 44 of spring marker element 36 is in a position to momentarily engage chart 14 on drum 13 as the recording element 26 is de-energized and thus place (on the fly) a short thin narrow mark on the chart corresponding to the instant of passage of the projectile past the associated marker station. As the projectile proceeds along its trajectory the recording elements connected to marker stations 1–10 operate in quick successive order and record upon the chart 14 the interval of time of passage of the projectile past each of these stations while the drum is rotating at a high speed.

The electromagnetic force of attraction of the armature with the poles of the electromagnet exceeds the effective spring torque applied to the armature by about 20 percent. This has been achieved by employing a spring marking element composed of .026 inch diameter music wire having a total of 6 turns loosely wrapped about a rod of 3/32 inch diameter when the marker is in the release position. By employing a spring type marker element having a helical wound portion formed therein, the helical portion of the spring in rotation places the spring material in "bend" thus utilizing Young's modulus "E" which stores the maximum amount of energy in the mass of the spring which results in the high force/low mass relation for maximum acceleration of the armature upon interruption of the operating circuit of the electromagnet. Furthermore, by employing a spring type marker having a double helix and bifurcated or "hair pin" connection therebetween, the bifurcated portion of the spring provides a marker pin of hard, smooth rounded surface suitable for placing a fine line marking upon the moving chart while the drum carrying the chart is rotating at a high speed, the movement of the marker pin with respect to the drum being shown in dashed outline on Fig. 3 and indicated by arrows. In addition to the foregoing the "hair pin" or bifurcated marker spring structure also provides means of supporting the armature for pivotal movement about the rod 35 and for adjustment of the armature into uniform contact with the parallel contacting surfaces of the core 27 and magnetic shell 28 when moved into engagement therewith by lever 43.

Each of the recording elements is adjusted to make a mark upon the rotating chart substantially instantaneously with the interruption of the operating circuit of the electromagnet associated therewith. It has been found in practice that the interval between the interruption of the operating circuit and the placing of the mark upon the rotating chart, while described herein as substantially instantaneous, is in fact accompanied by a slight delay. This delay has been found to be in the order of two ten thousands of a second and is made uniform for each of the recording elements by adjusting the flow of current in the electro-magnet of the recorder to a value such, for example, as 20 percent in excess of the value of current required to maintain the armature 39 in an operated position. This may be achieved in any well known manner such, for example, as by employing a variable resistor element 55 in the circuit of the electromagnet and measuring the current flow in the circuit by any well known means. Compensation is thus provided for differences in the resistance of the lines interconnecting the marker stations with the recorder by reason of the different lengths thereof, variations in battery voltage, differences in tension of spring marker elements 36 and the like. For example, the variable resistance element 55 may be set to an initial setting such that the current in the electromagnet is just sufficient to maintain the armature 39 operated when lever 43 is restored and thereafter resetting resistance element 55 to a final setting such that a predetermined increase of current through the electromagnet is obtained.

Whereas the invention has been disclosed with reference to a particular example which gives satisfactory results, it is not so limited as various changes and modifications will be apparent to those skilled in the art, after understanding the invention, without departing from the spirit and scope of the invention and it is intended, therefore, in the appended claims to cover all such changes and modifications.

What is claimed as new and desired to be secured by Letters Patent of the United States is:

1. An electro-mechanical chronograph of the character disclosed comprising a rotatable drum having a recording chart secured about the periphery thereof, means for rotating said drum at a uniform high rate of speed, a plurality of marker elements mounted for pivotal movement about an axis parallel to the axis of rotation of said drum, each of said marker elements being composed of spring wire and having a bifurcated portion formed in a central portion along the length thereof and two helical portions contiguous with said bifurcated portion and disposed about said first named axis, an electromagnet comprising a casing, a bearing pin carried by said casing concentric with said first-named axis and arranged within each of said helical portions, means for securing the ends of said wire to the associated casing, an armature carried by said bifurcated portion of the marker and normally in a release position with respect to said electromagnet, a normally closed energizing circuit for the electromagnet, manipulative means pivotally carried by said pin and operable independently of the armature for moving said armature into contact with the electromagnet as the manipulative means is moved into engagement with said armature, said electromagnet being of sufficient strength to maintain the armature in engagement therewith when the energizing circuit is closed and the manipulative means is disengaged from the armature, and a rounded marking surface at the other extremity of said bifurcated portion of the marker for marking said chart while the drum is rotating at high speed as the energizing circuit is interrupted.

2. A strip chart recorder of the character disclosed comprising a rotatable drum, a strip chart secured to said drum and rotatable therewith, means for rotating said drum at a fixed high rate of speed, a mounting plate arranged for pivotal movement selectively from an initial position about an axis parallel to the axis of rotation of said drum to a final position, a plurality of marker elements, each comprising a normally energized electromagnet secured to said mounting plate, each of said marker elements having a marker device composed of music wire and having a bifurcated portion formed centrally therealong, each of said marker devices having a pair of mutually aligned helical portions formed therein contiguously with said bifurcated portion about which helical portions the devices are pivoted, a plurality of bearing pins carried by each electromagnet respectively in mutually aligned relation and parallel to the axis of rotation of said drum, each of said pins being disposed within a respective pair of said helical portions for providing a pivotal mounting for the marker device associated therewith, an armature carried by said bifurcated portion and movable from a position of rest into a cocked position in magnetically locked engagement with said electromagnet when said mounting plate is in said initial position without contact with said chart during such movement, means for maintaining said mounting plate in said final position whereby the marking elements place fine marks on the chart during return of the marking devices to said position of rest as the armatures respectively associated therewith are released from said cocked position in response to the de-energization of said electromagnet while the drum is rotating at said high speed.

3. A device according to claim 2 including a circuit having means for energizing said electromagnet sufficiently to maintain said armature in said cocked position while the electromagnet is energized.

4. A device according to claim 3 including means responsive to a transient phenomenon for interrupting said circuit synchronously with the occurrence of said phenomenon.

References Cited in the file of this patent

UNITED STATES PATENTS

| | | |
|---|---|---|
| 418,391 | Stone | Dec. 31, 1889 |
| 1,937,376 | Zenner | Nov. 28, 1933 |
| 1,967,900 | Perry et al. | July 24, 1934 |
| 2,714,548 | Peterson | Aug. 2, 1955 |
| 2,812,997 | Diekmann et al. | Nov. 12, 1957 |